US012674908B2

(12) United States Patent
Mattsson et al.

(10) Patent No.: US 12,674,908 B2
(45) Date of Patent: Jul. 7, 2026

(54) SYSTEM AND METHOD OF TRACKING AN OBJECT THAT IS AT LEAST PARTLY BURIED IN SEABED

(71) Applicant: Kongsberg Discovery AS, Horten (NO)

(72) Inventors: Johan Mattsson, Trångsund (SE); Thorbjørn Rekdal, Høvik (NO)

(73) Assignee: Kongsberg Discovery AS, Horten (NO)

( * ) Notice: Subject to any disclaimer, the term of this patent is extended or adjusted under 35 U.S.C. 154(b) by 152 days.

(21) Appl. No.: 18/701,194

(22) PCT Filed: Oct. 14, 2022

(86) PCT No.: PCT/NO2022/050229
§ 371 (c)(1),
(2) Date: Apr. 12, 2024

(87) PCT Pub. No.: WO2023/063832
PCT Pub. Date: Apr. 20, 2023

(65) Prior Publication Data
US 2024/0402376 A1 Dec. 5, 2024

(30) Foreign Application Priority Data
Oct. 14, 2021 (NO) .................................... 20211242

(51) Int. Cl.
*G01V 3/08* (2006.01)
*B63G 8/00* (2006.01)
(Continued)

(52) U.S. Cl.
CPC .............. *G01V 3/08* (2013.01); *B63G 8/001* (2013.01); *B63G 8/38* (2013.01); *G01S 15/66* (2013.01);
(Continued)

(58) Field of Classification Search
CPC . G01V 3/08; G01V 1/38; G01V 11/00; G01V 3/081; G01V 3/165; G01V 3/083;
(Continued)

(56) References Cited

U.S. PATENT DOCUMENTS 8,055,193 B2 11/2011 Rhodes et al.
8,949,042 B1 2/2015 Goroshevskiy et al.
(Continued)

FOREIGN PATENT DOCUMENTS

FR 2354589 1/1978
JP 2016-159662 9/2016
(Continued)

OTHER PUBLICATIONS

Grim et al., "Magnetometric Localization and Measurement of Hidden AC Currents", 2019 IEEE Sensors, IEEE, Oct. 27, 2019, pp. 1-4.
(Continued)

*Primary Examiner* — Raul J Rios Russo
(74) *Attorney, Agent, or Firm* — Knobbe, Martens, Olson & Bear, LLP

(57) ABSTRACT

The disclosure relates to a system for tracking an object that is at least partly buried in seabed, the system comprising: An Autonomous Underwater Vehicle (AUV) having a hull, a controlled electric dipole source mounted on the hull of the AUV; first sensor assembly mounted on the hull in the proximity of starboard side of the AUV (1); second sensor assembly mounted on the hull in the proximity of port side of the AUV; wherein the first and the second sensor assemblies are configured to measure magnetic field from electromagnetic energy transmitted from the controlled electric dipole source. The disclosure further relates to a method of tracking an object that is at least partly buried in seabed.

17 Claims, 11 Drawing Sheets

(51) Int. Cl.

| | |
|---|---|
| *B63G 8/38* | (2006.01) |
| *G01S 15/66* | (2006.01) |
| *G01V 1/38* | (2006.01) |
| *G01V 3/15* | (2006.01) |
| *G01V 3/165* | (2006.01) |
| *G01V 11/00* | (2006.01) |

(52) U.S. Cl.

CPC ............... *G01V 1/38* (2013.01); *G01V 3/081* (2013.01); *G01V 3/083* (2013.01); *G01V 3/15* (2013.01); *G01V 3/165* (2013.01); *G01V 11/00* (2013.01); *B63G 2008/004* (2013.01); *Y02A 90/30* (2018.01)

(58) Field of Classification Search

CPC . G01V 3/15; G01V 3/10; G01V 3/101; G01V 3/102; G01V 3/104; G01V 3/105; G01V 3/107; G01V 3/108; G01V 3/16; B63G 8/001; B63G 8/38; B63G 2008/004; G01S 15/66; Y02A 90/30

USPC ......................................................... 324/326

See application file for complete search history.

(56) References Cited

U.S. PATENT DOCUMENTS

| | | | | |
|---|---|---|---|---|
| 11,061,160 | B1 | 7/2021 | Weber | |
| 2013/0081564 | A1* | 4/2013 | Brizard | B63B 27/36 |
| | | | | 114/259 |
| 2015/0000582 | A1* | 1/2015 | Lelaurin | B63B 25/002 |
| | | | | 114/257 |
| 2016/0280345 | A1* | 9/2016 | Brizard | B63G 8/14 |
| 2017/0074664 | A1 | 3/2017 | Cheramie | |
| 2017/0137098 | A1* | 5/2017 | Valsvik | B63G 8/08 |
| 2017/0242144 | A1* | 8/2017 | Brizard | B63G 8/001 |
| 2017/0243403 | A1* | 8/2017 | Daniels | G06F 3/1454 |
| 2019/0256181 | A1* | 8/2019 | Valsvik | B63G 8/08 |

FOREIGN PATENT DOCUMENTS

| | | |
|---|---|---|
| WO | WO 2006/134329 | 12/2006 |
| WO | WO 2012/052564 | 4/2012 |
| WO | WO 2018/219975 | 12/2018 |
| WO | WO 2019/145798 | 8/2019 |

OTHER PUBLICATIONS

Schultz et al., "Underwater controlled source electromagnetic sensing: Locating and characterizing compact seabed targets", Oceans, 2012, IEEE, Oct. 14, 2012, pp. 1-9.

Takizawa et al., "Estimation Algorithm for EM Sensing of a Buried Object under Seabed", Oceans 2021: San Diego—Porto, MTS, Sep. 20, 2021, pp. 1-4.

Extended European Search Report dated Jul. 29, 2025 in Application No. 22881442.2, 13 pages.

Examination Report dated Jul. 4, 2025 in Indian Application No. 202447030712, 7 pages.

Norwegian Search Report for Patent Application No. 20211242 dated May 11, 2022 in 2 pages.

International Search Report and Written Opinion for International PCT Application No. PCT/NO2022/050229 dated Jan. 12, 2023 in 11 pages.

Jacobi, M. "Multi sensor underwater pipeline tracking with AUVs," 2014 Oceans, Sep. 14-16, 2014, St. John's, NL, Canada, pp. 1-6, DOI: 10.1109/00 2014.7003013.

Johan, Mattsson and Peter Sigray, "Electromagnetic Sea-Mine Detection," FOA-R—00-01547-409—SE, ISSN 1104-9154, 2000.

Lennart, Crona, Tim Fristedt, Johan Mattsson and Peter Sigray, Sea-trials with active EM for sea-mine detection, FOA-R—00-01757-313—SE, ISSN 1104-9154, 2000.

Nikolovska, A., "AUV based flushed and buried object detection," Oceans 2015, Genova, Italy, 2015 pp. 1-5, DOI: 10.1109/OCEANS-Genova.20157271651 in 5 pages.

Zhang, J. and X. Xiang, "Subsea cable tracking by a 5-DOF AUV," 2017 36th Chinese Control Conference (CCC), Dalian, China, 2017, pp. 4796-4800, DOI: 10.23919/ChiCC.2017.8028111 in 5 pages.

\* cited by examiner

The relative sensitivity: 100*abs((Ez₁ - Ez₀)/abs(Ez₀))

SYSTEM AND METHOD OF TRACKING AN OBJECT THAT IS AT LEAST PARTLY BURIED IN SEABED

TECHNICAL FIELD

The present disclosure relates to a system for tracking an object that is at least partly buried in seabed and a method of tracking an object that is at least partly buried in seabed. More specifically, the disclosure relates to a system for tracking an object that is at least partly buried in seabed and a method of tracking an object that is at least partly buried in seabed as defined in the introductory parts of claim 1 and claim 10.

BACKGROUND ART

Maintenance and tracking of pipelines are an important work task in the lifecycle management of offshore underwater installations. The use of Autonomous Underwater Vehicles (AUVs) equipped with a variety of sensors for different purposes enables large scanning surveys to be performed in a fast and cost efficiently way. The AUV can autonomously inspect and track pipelines over large distances. It is capable of adaptive steering if the pipeline is above the seafloor. However, as soon as the object is buried, the AUV might lose track of the object. To overcome this, the AUV can be equipped with Sub Bottom Profiler (SBP) sensors to collect data that is utilized in an adaptive steering algorithm to determine the location of the buried pipeline with a certain accuracy. However, the object can be too small to be distinguished from the surroundings using SBP.

In addition to acoustic sensors for various underwater operations, electromagnetic sensors can be used. Magnetic fields sensors and electrode sensors are utilized in a broad range of marine applications to measure the magnetic and electric fields, respectively. For example, Controlled Source Electromagnetics (CSEM) in exploration for oil & gas has been used for a couple of decades with the purpose to determine electrical resistivity in sub-bottom rock formations.

CSEM technology in underwater environments has also been developed for detection of buried objects like sea mines and unexploded ordnance (UXO). A CSEM method for detecting and locating buried metal objects was developed in year 2000 at the Swedish Defense Research Agency (FOI). The method consisted in a horizontal electric dipole source in combination with a vertical electrode receiver pair in the middle of the source. Examples of published information in this area are given in Johan Mattsson and Peter Sigray, Electromagnetic Sea-Mine Detection, FOA-R-00-01547-409-SE, ISSN 1104-9154, 2000 which discloses results from experimental activity and numerical model development of a sub-surface mine hunting system. A comparison between electrical and magnetic transmitter/receiver techniques is made. It is concluded that from an operational point of view it is an advantage to use the electrical transmitter/receiver configuration. The development of models is briefly presented, and a numerical example of a mine detection application is given. The calculated scattered field from two mine-like structures are presented. Some conclusions are finally made for a future mine hunting system.

Lennart Crona, Tim Fristedt, Johan Mattsson and Peter Sigray, Sea-trials with active EM for sea-mine detection, FOA-R--00-01757-313-SE, ISSN 1104-9154, 2000; discloses sea-trials with an active electromagnetic transmitter/ receiver. The receiver was constructed to be orthogonal to the transmitter principal axis. The trials were divided into two parts. Firstly, the field, measured by the receiver due to misalignment between the receiver and transmitter, was minimized. An attenuation of 82 dB was possible to achieve. Secondly, the detection of a mine-like object was performed. After the optimization of orthogonality, detection of a spherical steel object was performed by dragging it parallel to the transmitter main axis. The distance between the sphere and the transmitter was 2 meters. The response from the sphere was clearly seen in the measured signal. Finally, experimental and theoretical results were compared.

A similar CSEM method for locating underwater metal objects is disclosed in the patents WO 2006/134329 A2 and U.S. Pat. No. 8,055,193 B2. However, the physics described in these patents relates detection of a reflected wave at transmitted frequencies of 1-3 MHz. This type of physics does not work in seawater of conductivity typical to the oceans. Energy with frequencies in this region would only propagate a few meters in the water and would not reflect from an object like a reflected wave as in radar applications in air or with underwater acoustic sonars. The relevant physics is correctly described in a diffusion like manner where much lower frequencies should be used for a practical underwater CSEM sensor system for detection and localization of buried metal objects.

Underwater electromagnetic techniques have also been developed and used for pipeline inspections of various kind. Passive electric field measurements from Remotely Operated Vehicles (ROVs) have been widely used for cathodic protection inspections of pipelines or other underwater constructions. Another passive EM technology related to pipelines or underwater metal constructions in general is magnetic tomography. A device for magnetographic identification and magnetographic analysis of mechanical flaws is disclosed and described in U.S. Pat. No. 8,949,042 B1. It discloses an autonomous magnetic tomography method (MTM) and device for magnetographic identification and magnetographic analysis of mechanical flaws and defects along structures located deep in the sea or otherwise located underwater and further underground. The invention optimizes the inspection and maintenance processes of extended metallic constructions, e.g., pipelines. The device is based on the inverse magnetostrictive effect (i.e., the Villari effect)—the variation of a material's magnetic susceptibility under applied mechanical stress. The changes in magnetic susceptibility result in distribution of a magnetic field gradient along a structure's Surface area, thus providing information about the presence and the value of the magnetic field anomaly at a given and precise location on the structure. The device and method are capable of autonomous and offline operation underwater at depths up to 1,500 meters below sea level.

SUMMARY

According to a first aspect there is provided a system for tracking an object that is at least partly buried in seabed, the system comprising: An Autonomous Underwater Vehicle having a hull, a controlled electric dipole source mounted on the hull of the AUV; first sensor assembly mounted on the hull in the proximity of starboard side of the AUV; second sensor assembly mounted on the hull in the proximity of port side of the AUV; wherein the first and the second sensor assemblies are configured to measure magnetic field from electromagnetic energy transmitted from the controlled electric dipole source.

3

According to some embodiments, the controlled electric dipole source comprises at least two metal electrode plates mounted outside the hull of the AUV.

According to some embodiments, the first sensor assembly and the second sensor assembly each comprises 3-axes magnetometers.

According to some embodiments, the first sensor assembly and the second sensor assembly are separated from one another in a y-direction by a distance d.

According to some embodiments, system comprises one or more 3-axis gradiometers.

According to some embodiments, the controlled electric dipole source operate in the frequency range between 10 and 10000 Hz.

According to some embodiments, the system further comprises a processor which is configured to use measurements from the first sensor assembly and the second sensor assembly to create a conductivity structure of the buried object.

According to some embodiments, the system further comprises one or more sources and acoustic sensors for recording reflected acoustic signal from the buried object.

According to some embodiments, a position of the buried object relative to the AUV is estimated from the magnetic data measured with the first and the second sensor assemblies.

According to a second aspect there is provided a method of tracking an object that is at least partly buried in seabed, the method comprising steps of: transmitting electromagnetic energy from an Autonomous Underwater Vehicle having a hull equipped with a controlled electric dipole source; measuring magnetic field, amplitude and phase with a first sensor assembly and a second receiver assembly mounted on the AUV, wherein the first and the second sensor assemblies are separated from one another by a distance d in a direction that is perpendicular to the longitudinal direction of the AUV; using the measured magnetic field data amplitudes and phases differences between the first sensor assembly and the second sensor assembly to determining an estimate of a position of the buried object in relation to the AUV.

According to some embodiments, the electromagnetic energy transmitted by the controlled electric dipole source containing discrete frequencies between 10 and 10000 Hz and having a 1-10 seconds long output sequence.

According to some embodiments, the buried object being a pipeline.

According to some embodiments, the method further the method comprises a processor which is configured using measurements from the first and second sensors to creating a conductivity structure of the buried object.

According to some embodiments, the processor is further configured to steering the AUV along the buried object.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
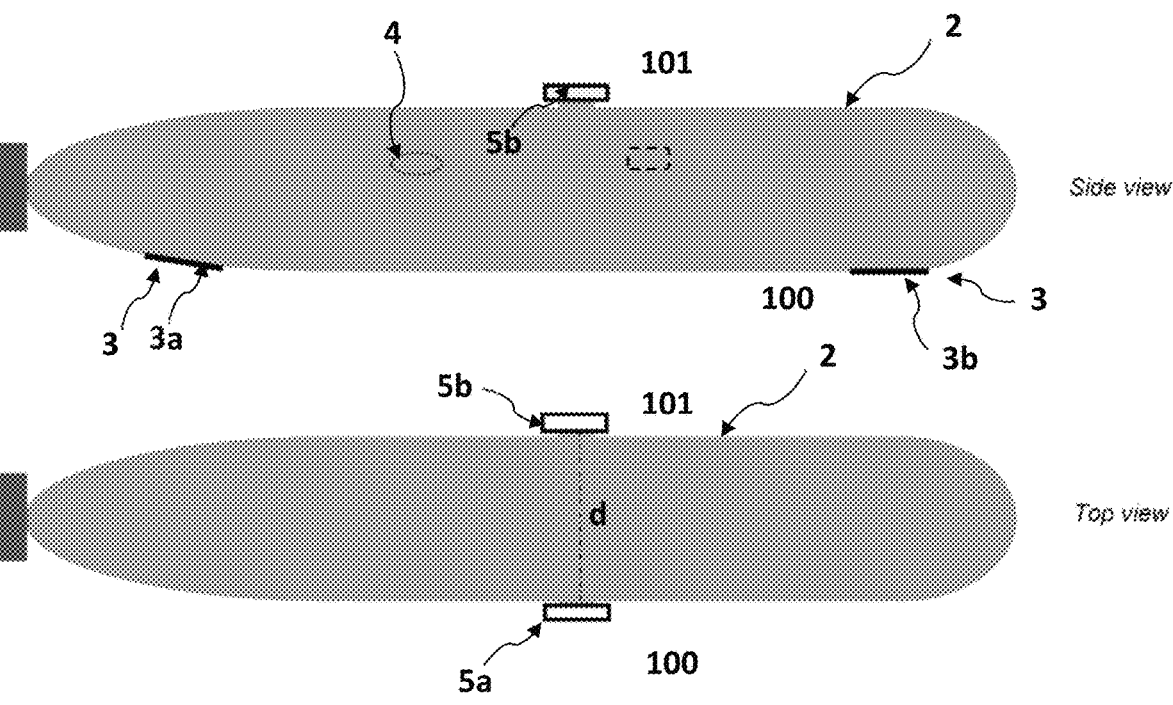
FIG. 1 shows a side view and top view of an Autonomous Underwater Vehicle for tracking buried object.

FIG. 1 shows a side view and top view of a system for tracking an object that is at least partly buried using an Autonomous Underwater Vehicle, referred to as AUV from hereon. The system comprises at least one AUV 2 equipped with a controlled electric dipole source 3 comprising at least two metal electrode plates 3a, 3b mounted on the AUV 2. In this embodiment, the controlled electric dipole source is mounted on the outside of the hull, on the bottom part of the hull.

The system further comprises source electronics 4 which in this embodiment are located inside the AUV 2. The source electronics 4 are connected to the two electrode plates 3*a* and 3*b* with cables through the hull, and are adapted to operate the controlled electric dipole source. The source electronics 4 may be powered with a battery inside the hull of the AUV 2 with a sufficient capacity for e.g. a 12-hour survey.

The system further comprises first sensor assembly 5*a* and second sensor assembly 5*b*, which are configured for measuring the magnetic field. The first sensor assembly 5*a* is mounted on the hull in the proximity of the starboard side 100 of the AUV 2 and the second sensor assembly 5*b* is mounted on the hull in the proximity of the port side 101 of the AUV 2. The first and the second sensor assemblies are 3-axes magnetometers and are separated from one another in a y-direction by a distance d.

Although, FIG. 1 shows the AUV 2 with only two metal electrode plates, the AUV 2 may comprise more than two metal electrodes and additional sensor assemblies.

Figure 2:
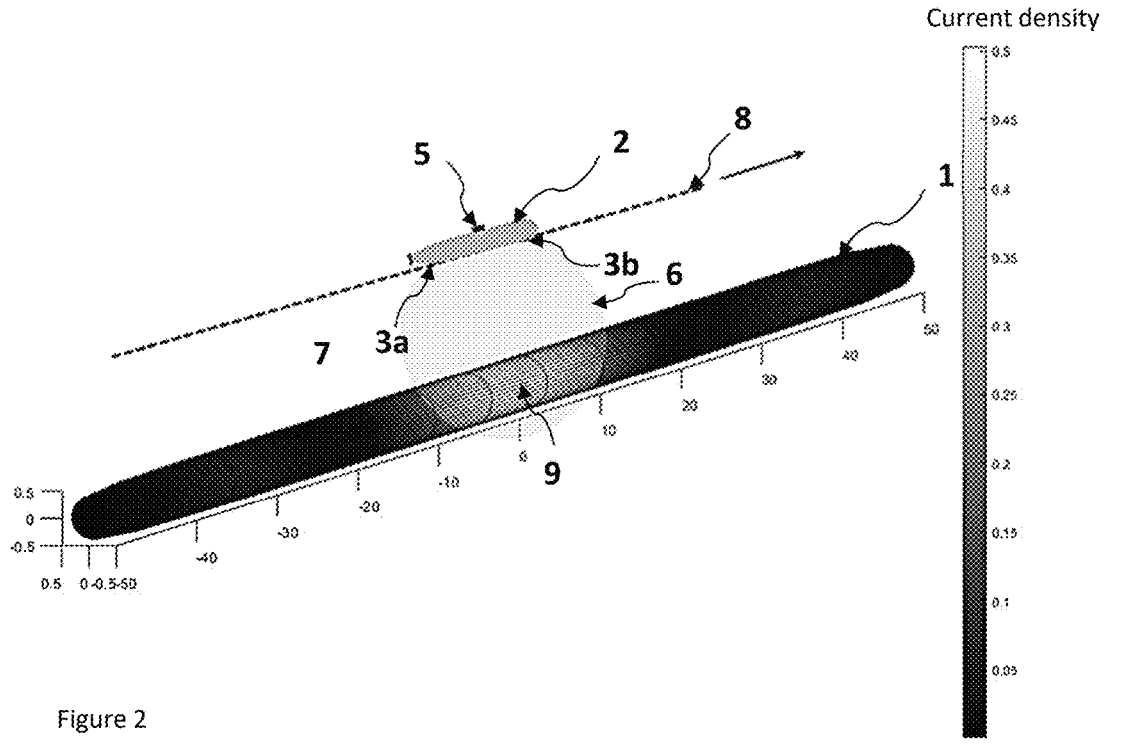
FIG. 2 shows the Autonomous Underwater Vehicle tracking the buried object.

FIG. 2 shows the AUV 2 tracking an object 1. The object 1 may be a pipeline buried on the seafloor. Electric current 6 is transmitted through the source electrodes 3*a*, 3*b* into the seawater 7 in sequences 10 (shown in FIG. 3) of suitable lengths when the AUV 2 is moving along a survey line 8 close to where the buried object 1 is located. The sequences are configured to contain frequencies between 10-10000 Hz or a subset of these frequencies. Measurements of the resulting magnetic field with the first and the second sensor assemblies 5*a*, 5*b* are carried out simultaneously. The transmitted electric current 6 interacts with the buried object 2, in this case a pipeline construction, resulting in a change in the measured magnetic field. This change is caused by an induced electric current on the buried object portion 9 (light colour in the figure) which acts as a secondary source and radiates back towards the AUV 2.

Figure 3:
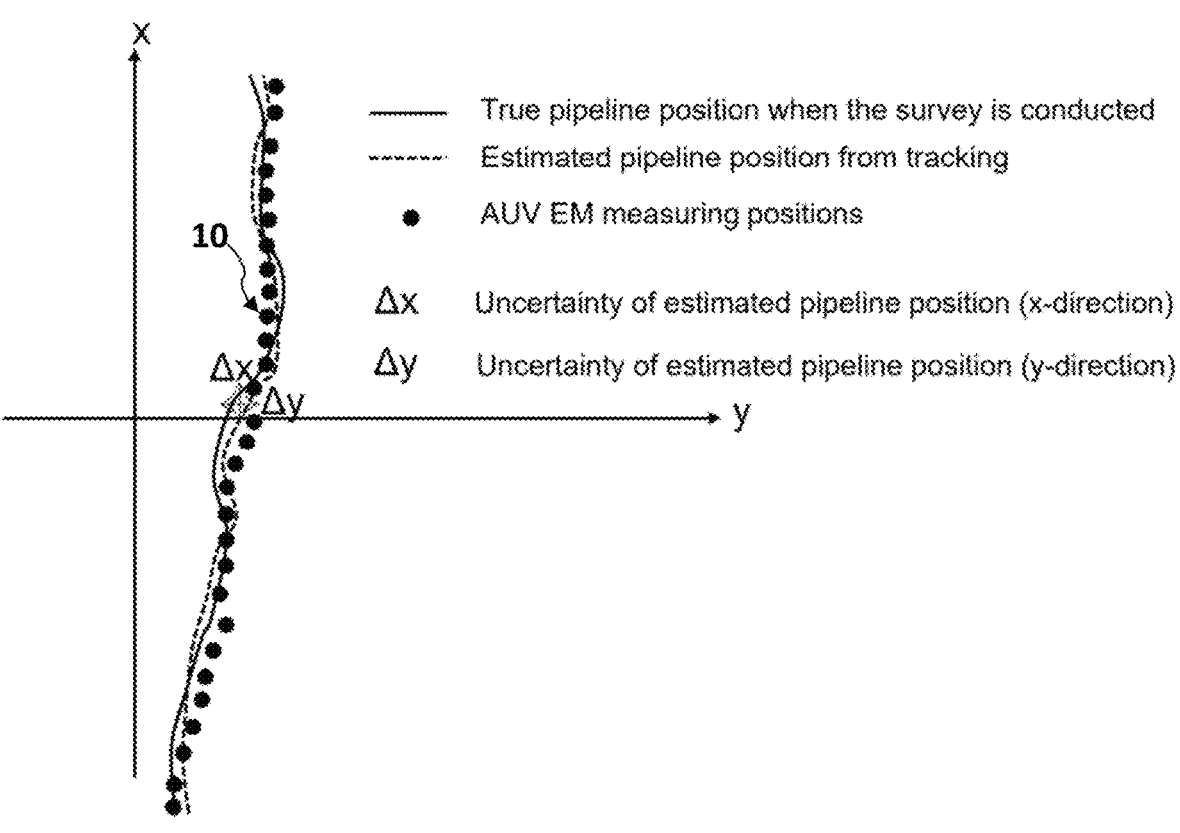
FIGS. 3 and 4 show a schematic illustration of position estimation of the buried object.

FIG. 3 shows position estimation of the buried object. The active electric dipole source transmits electric current in sequences 10. This sequences maybe between 1-10 seconds long. These sequences are visualized 10 as the black dots in FIG. 3. The resulting magnetic field is measured during every source sequence 10 with the first and the second receiver assemblies. A position (x, y, z) of the part of the buried object underneath or close to the AUV is estimated by inversion of the magnetic data. The estimated position is then fed into a tracking algorithm, for example a Kalman filter, and used as guidance for steering the AUV 2 along the new estimated path of the buried object, marked as dotted line in FIG. 3. The uncertainties (Δx, Δy, Δz) i.e. the deviation from the true buried object path shown as the solid black line in FIG. 3, are also calculated in the tracking algorithm.

In one embodiment, the system further comprises acoustic source and receivers and gradiometers. Data from the acoustic sensors and the gradiometers, where applicable, may be used to reduce the deviation uncertainties and to further increase the accuracy of the position estimation.

The position (x, y, z) of a portion of the buried object closest to the AUV 2 is determined by analysis of the magnetic data for each of the time sequences. In particular, the magnetic field data amplitudes and phases as well as differences of amplitudes and phases between the first and the second sensor assemblies are analysed. This is repeated throughout the entire survey line 8 for all sequences of transmission to give the location of the entire buried object.

The magnetic field generated by the electric dipole source is sensitive to the presence of metal bodies like a pipeline. In particular, the cross component to the inline AUV direction (y-direction), is the most sensitive vector component of the magnetic field in the presence of a buried object, such as pipeline with high electrical conductivity. The buried pipeline acts as a scatter and radiates back a dipole like field. A typical scattering effect from the buried object is seen in FIG. 2 where the grey scale colour on the buried object body 1 represents the induced electric surface current density that is radiating back towards the AUV 2. The induced electric current acts as a secondary source which modifies the magnetic field without a metal body present. When a suitable source/receiver configuration and frequency range is chosen, this secondary field becomes big enough to give enough sensitivity and signal to noise ratio for being useful in the inversion for the position of the illuminated part in FIG. 2.

Figure 4:
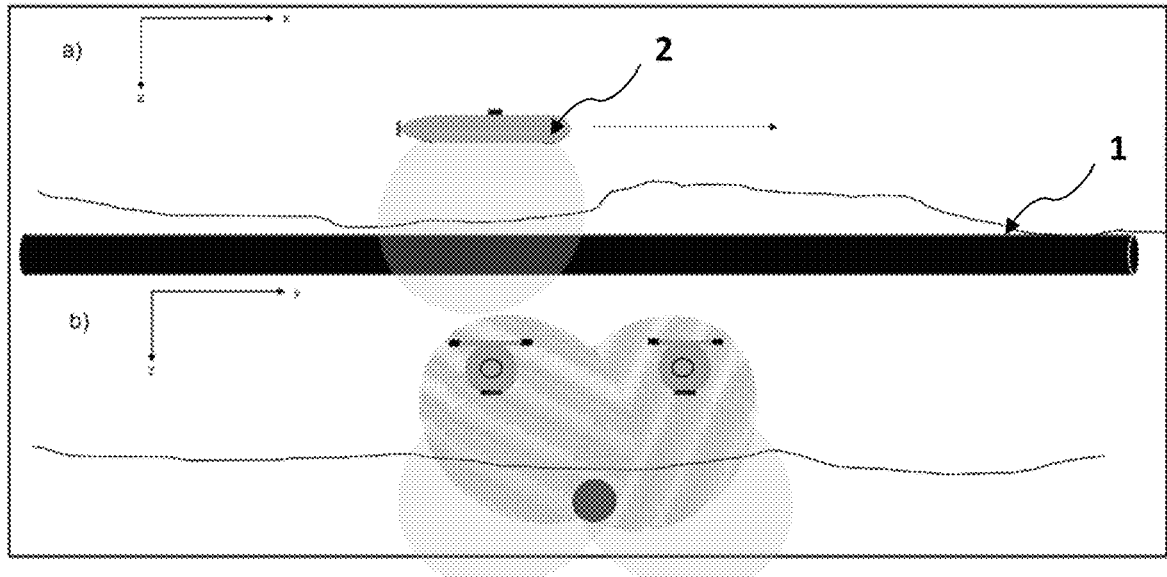

As shown in FIG. 1, the system comprises at least two sensor assemblies. It is important to remove the position symmetry around the buried object 2. FIG. 4 shows an illustration of the illumination. The AUV 2 is illuminating parts of the buried object when sailing along the buried object in the x direction. The AUV 2 is guided along the buried object 2 by using a tracking algorithm that is derived from data from the first and the second sensor assemblies. The data difference between the first and the second sensor assemblies breaks the position symmetry. For example, by subtracting the magnitude of the sensitivity registered in first sensor assembly from the magnitude of the sensitivity registered in the second sensor assembly will indicate where the buried object lies in relation to the AUV 2. The data differences change polarity when the AUV 2 moves from one side of the buried object to another. With only one sensor assembly, the magnetic field data would look the same on both sides of the buried object. The data difference between the first and the second sensor assemblies signal can also be expressed as the phase and amplitude difference.

One of the inversion algorithms that can be used is a least square minimization algorithm where a so-called objective function of the differences between modelled and measured data is minimized with respect to the (x, y, z) coordinates of the buried object portion underneath or close to the AUV 2. This means that these coordinates are changed in the algorithm for the modelled data within the minimization algorithm until a modelled data agrees sufficiently well with the measured data by the AUV 2. In this case, the measured data consists of the differences between the magnetic data from the first and the second sensor assemblies. The corresponding modelled data is computed from a fast forward modelling code.

The estimated position from the inversion algorithm for each buried object part is fed into a tracking algorithm and is used to determine an updated path of the buried object. The survey line for the AUV 2 is also updated with a tracking algorithm to stay as close as possible to the buried object 1. Being near the buried object 1 enhances the data quality and hence the position estimated at every sequence becomes more accurate. Modelling results of sensitivity and signal to noise ratio are shown in the example below.

Figures 5, 6A:
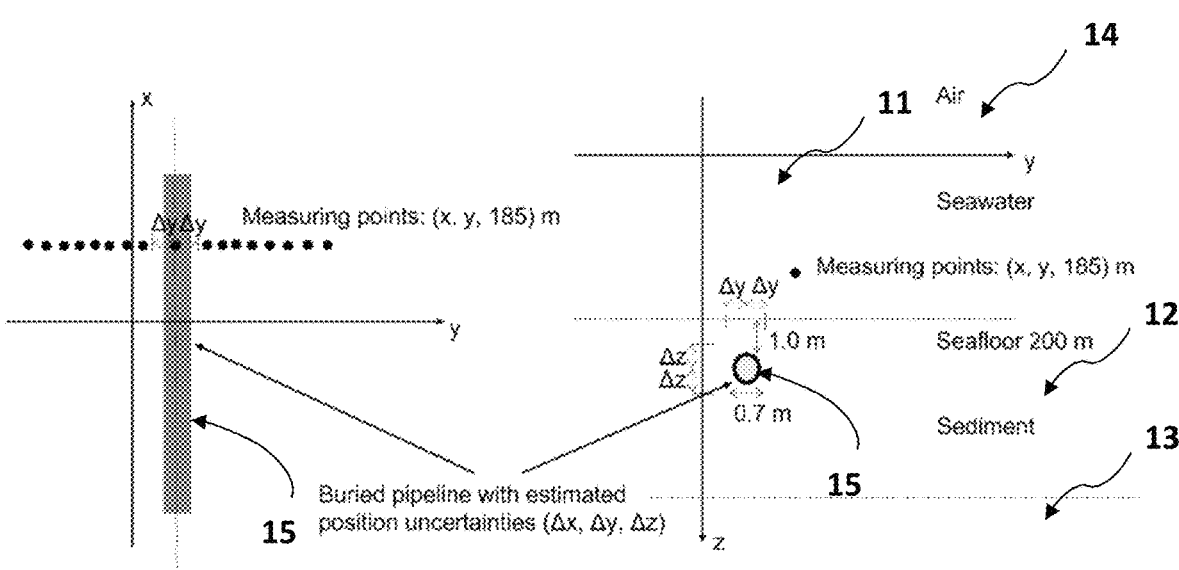
FIG. 5 shows horizontal and vertical cross-sections of the model geometry.
FIGS. 6a-6c show plots of relative sensitivity and signal to noise ratio versus cross position for the electric field z-component and magnitude versus cross position without noise for electric field z-component for frequencies 10, 100, 1000 and 10000 Hz.
Figure 6B:
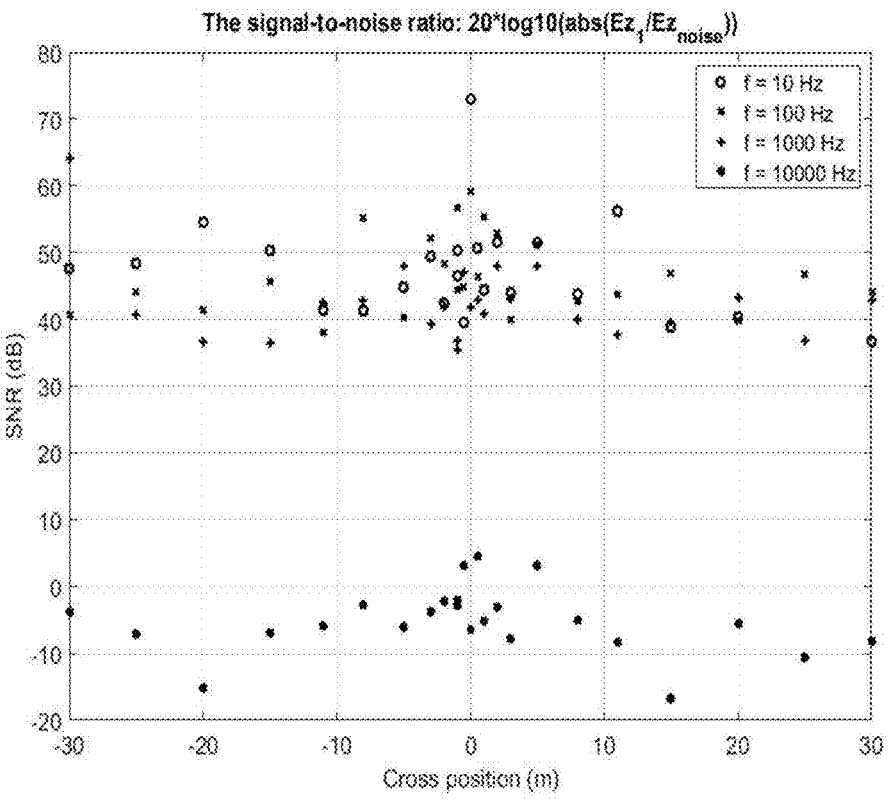
Figure 6C:
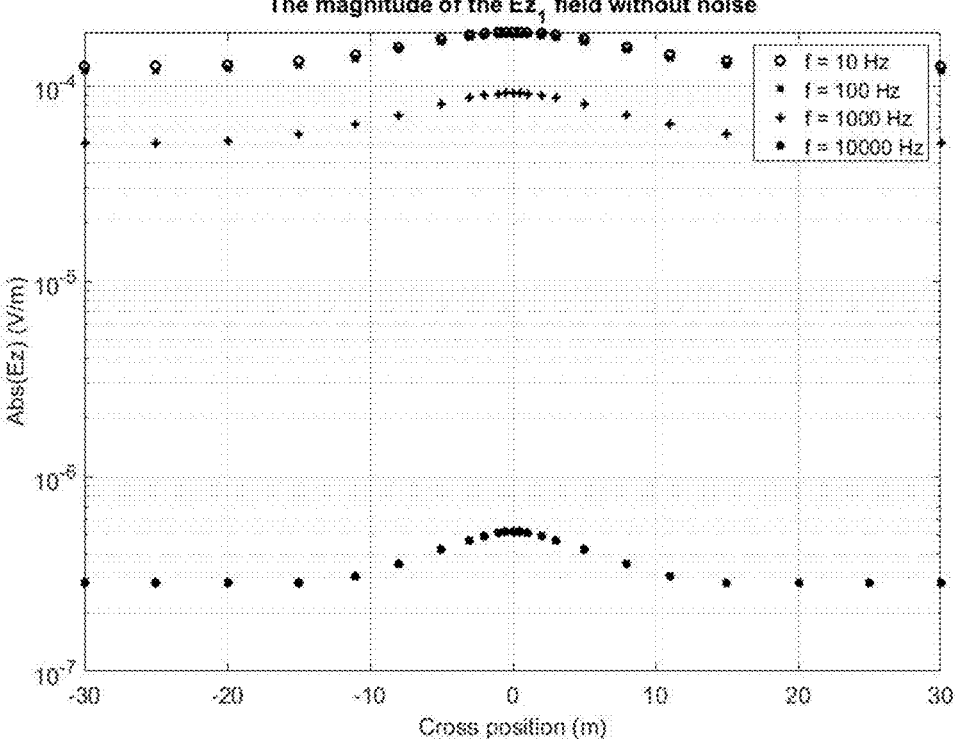
Figure 6D:
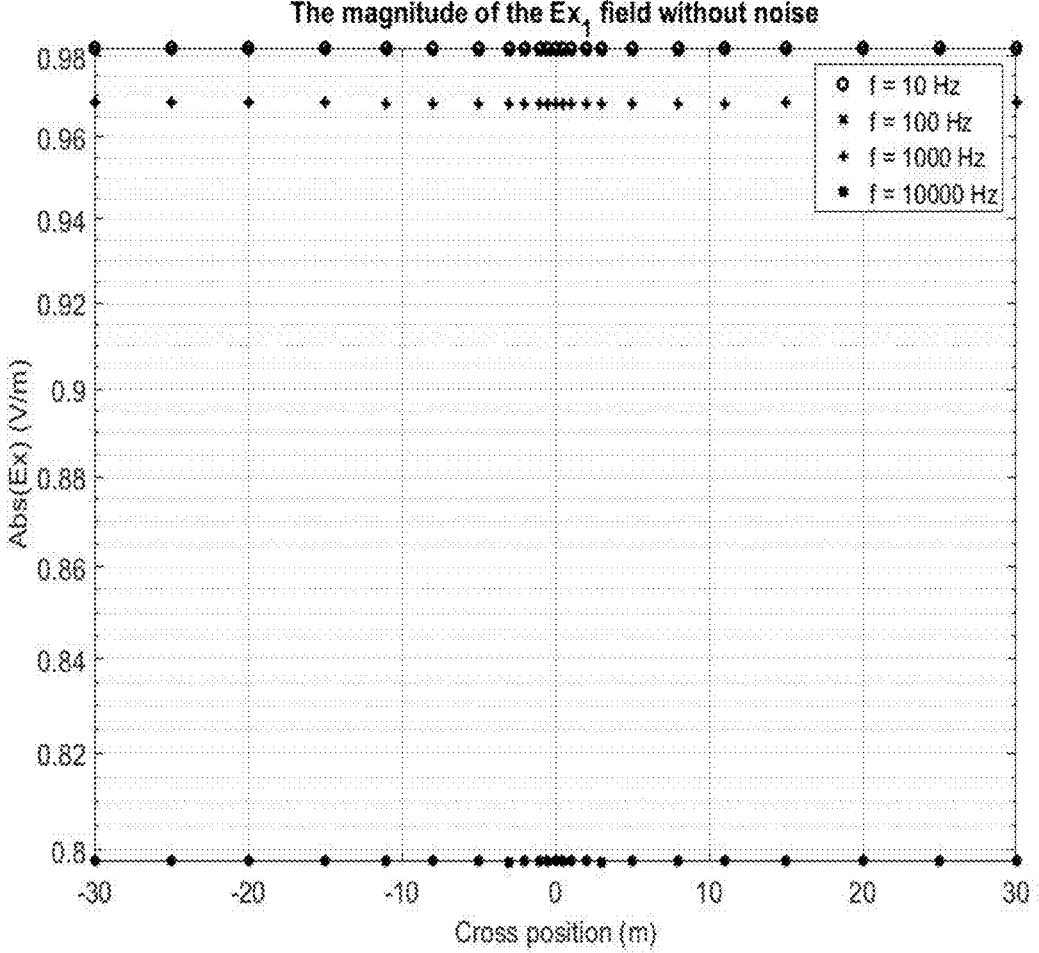
FIG. 6d is the same as FIG. 6c but shows the electric field x-component.

To test the feasibility of the invention, various electromagnetic source and receiver configurations were numerically modelled in a 3D geometry with a model of the buried object, this case a pipeline. FIG. 5 shows horizontal and vertical cross-sections of the model geometry. The environment consists of a 200 m deep seawater layer 11 of 3 S/m conductivity. Below the seafloor follows a 100-m thick sediment layer 12 with a conductivity of 0.2 S/m. A semi-infinite layer 13 of 0.1 S/m underlays both layers. In this case, the air 14 is also represented as the uppermost semi-infinite layer but with zero conductivity.

The model of the buried object underneath the AUV consists of a 100 m long cylindrical steel tube 15 with a diameter of 0.7 m. The electric conductivity of steel is 107 S/m. Hence, the cylindrical tube 15 is modelled as a perfect conductor. The tube is buried 1 m below the seafloor 11.

To test out the sensitivity to the steel tube 15, a horizontal electric dipole source is placed at the black dots in FIG. 5. The dipole source is pointing in the x-direction, i.e. parallel to the steel tube 15, and is placed 15 m above the seafloor at x=0. The source is then moved in the cross direction from y=–30 to y=30 m. The source strength is 500 Am and the four frequencies 10, 100, 1000 and 10000 Hz are chosen to cover a broad frequency range.

At this phase a sensitivity and a signal to noise calculation are performed with a sensor position 3 m in front of the source i.e. at x=3 m and with y- and z-coordinates the same as for the source. In this model, both the electric and magnetic fields are computed for all the source positions. The electric field results are shown in FIGS. 6a-6d and the magnetic results in FIGS. 7a-7d and 8a-8c. Synthetic white noise with realistic mean and standard deviation values is added to the computed field values.

It is noticeable that the sensitivity for the $E_z$-component is good enough for all four frequencies. For example, a 70% sensitivity with a frequency at 1000 Hz is excellent. The signal to noise ratios are also sufficient for three of the frequencies. It is too low for 10000 Hz. Acceptable threshold for signal to noise ratio is above 20 dB. The sensitivity for the $E_x$-component is just a fraction of a percent and hence not useful and in this modelling configuration the $E_y$-component is zero. So, the only useful electric field component would be in the z-direction. However, this component is also disqualified because of the amplitude differences between FIGS. 6c and 6d. The $E_x$-amplitude is 104 times higher than the $E_z$-amplitude which makes it very difficult to handle such measurement configuration in practice. In fact, a very small deviation from perfectly perpendicular electrode pair axes would cause a leakage of the $E_x$-component into the $E_z$-component and decrease the sensitivity too much. This means that electric field measurements are not applicable for this kind of application with this measurement configuration using one AUV.

Figure 7A:
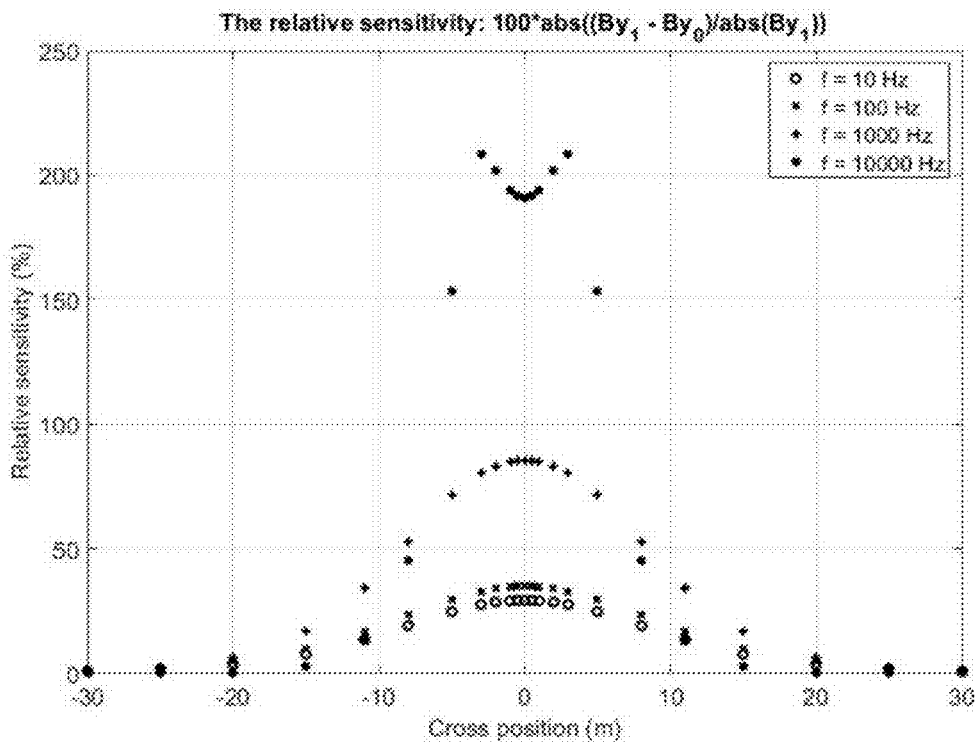
FIGS. 7a-7d show plots of relative sensitivity and signal to noise ratio versus cross position for the magnetic field y-component and phase difference versus cross position with and without noise for magnetic field y-component for frequencies 10, 100, 1000 and 10000 Hz.
Figure 7B:
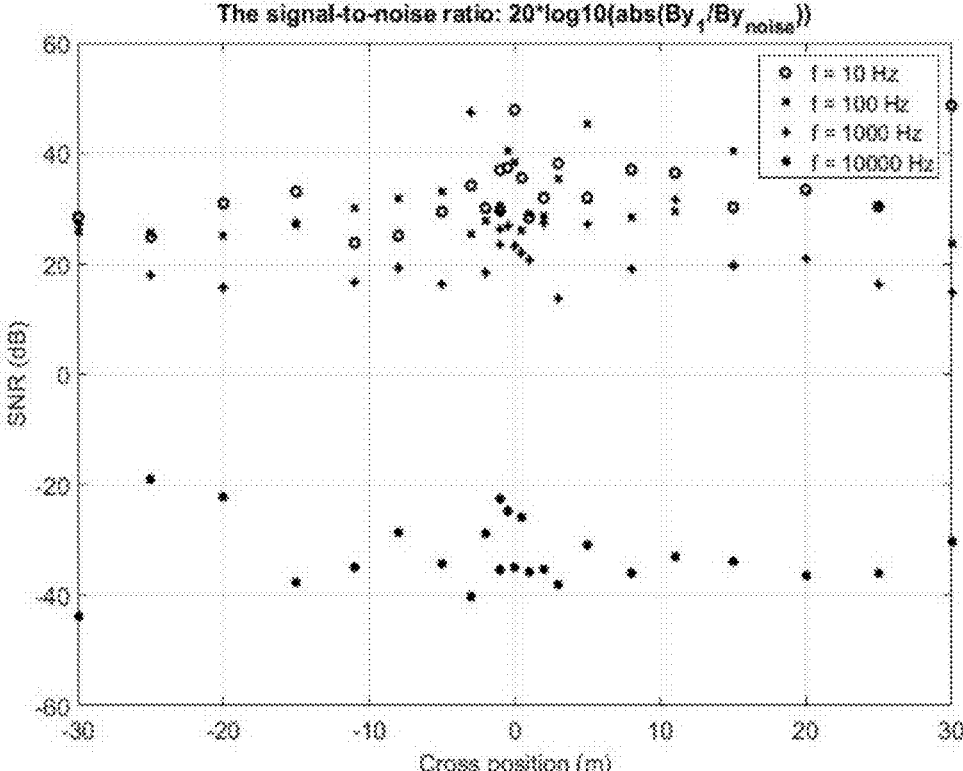
Figure 7C:
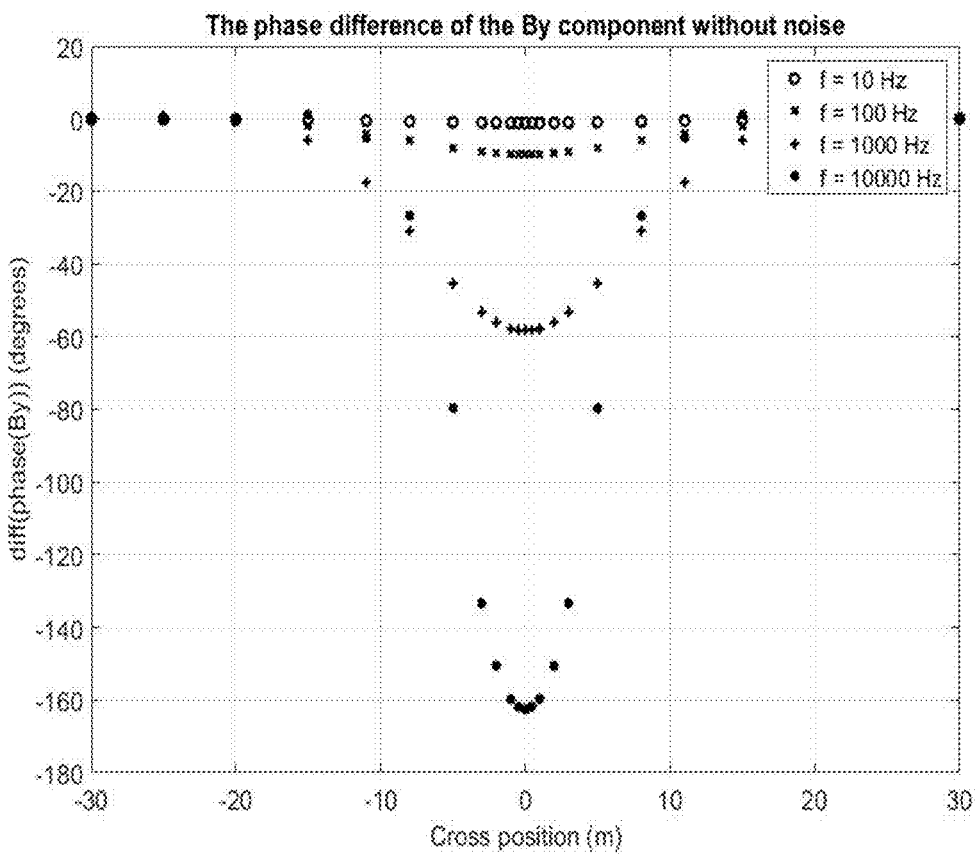
Figure 7D:
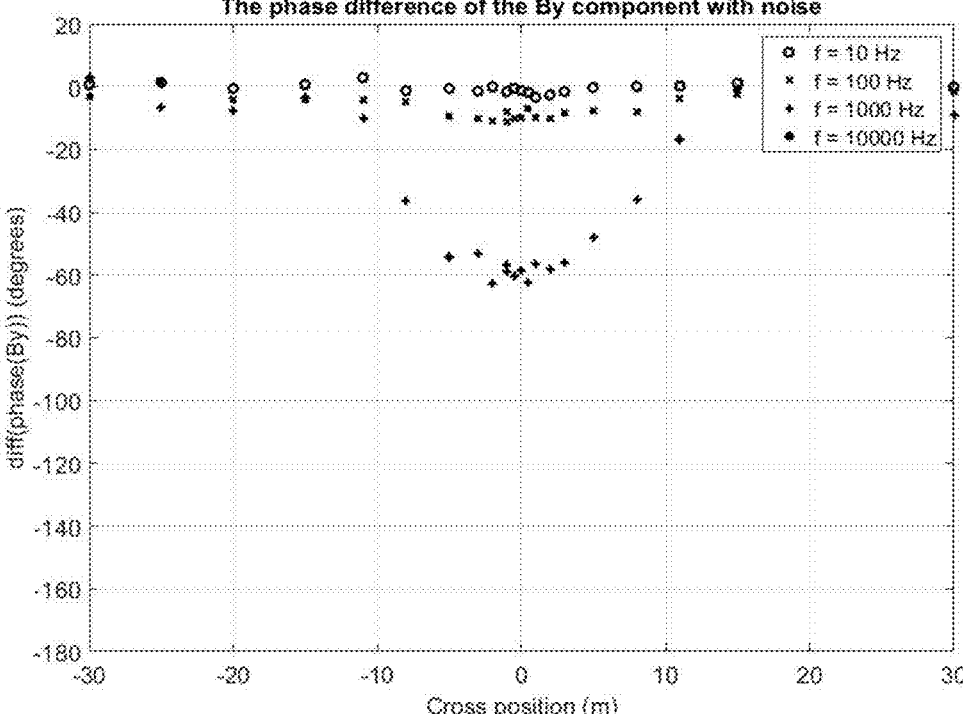
Figure 8A:
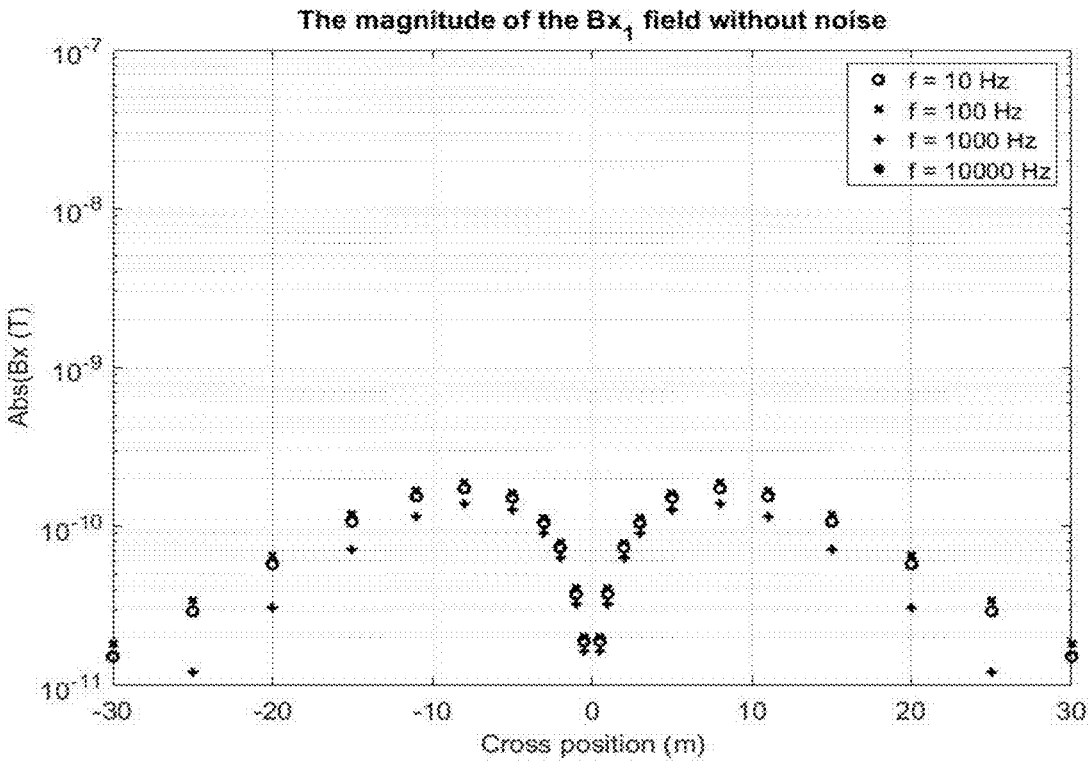
FIGS. 8a-8c show plots of magnitude versus cross position without noise for the magnetic field x, y and z-components for frequencies 10, 100, 1000 and 10000 Hz.
Figure 8B:
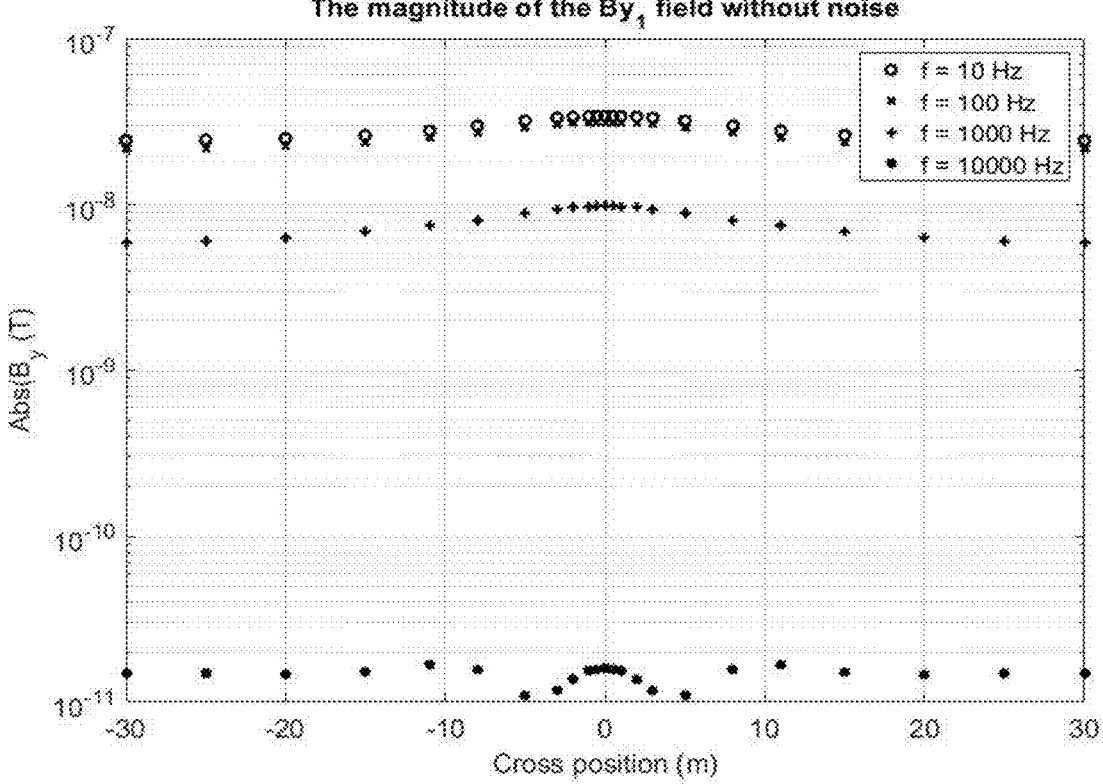
Figure 8C:
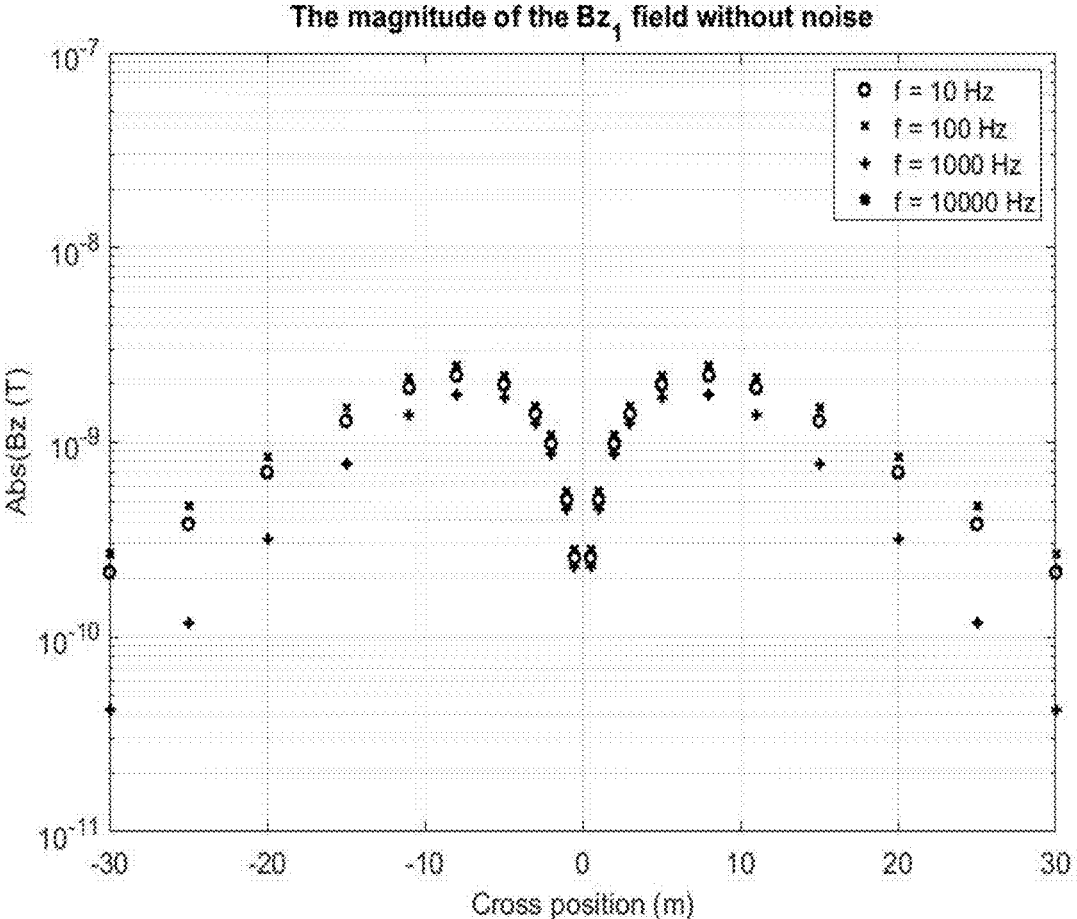
Figure 9A:
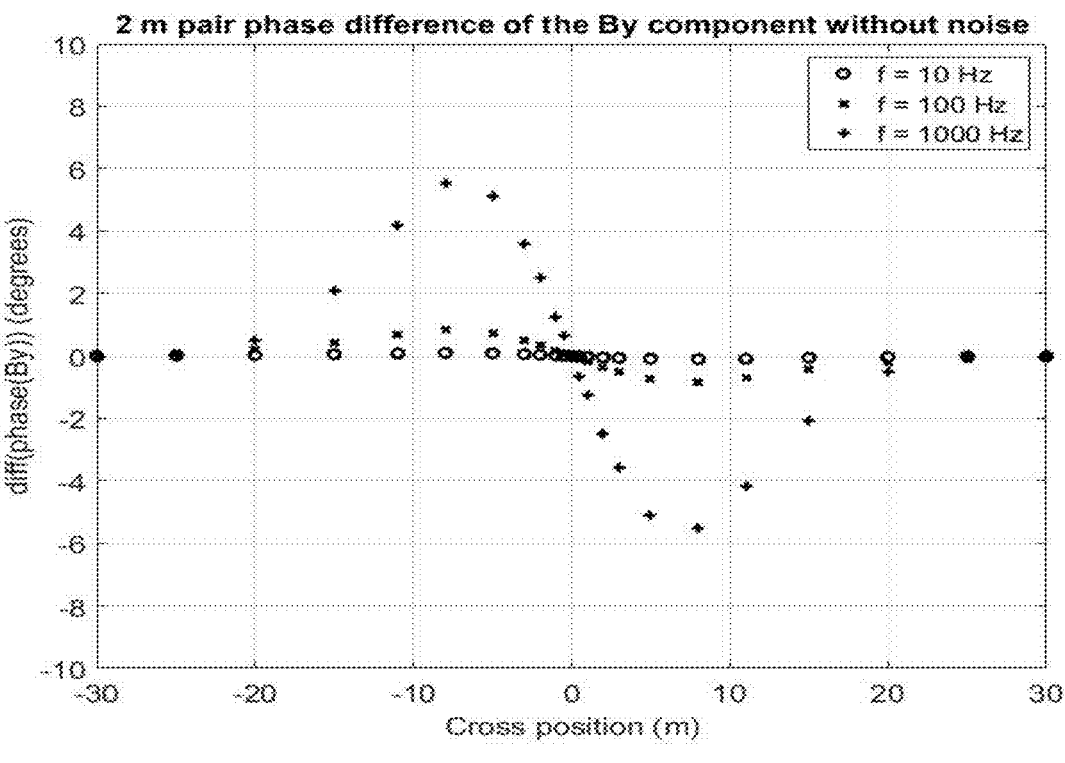
FIGS. 9a-9b show plots of the phase differences between the magnetic field y-components from two sensors separated by 2 m with and without noise for frequencies 10, 100, 1000 Hz.
Figure 9B:
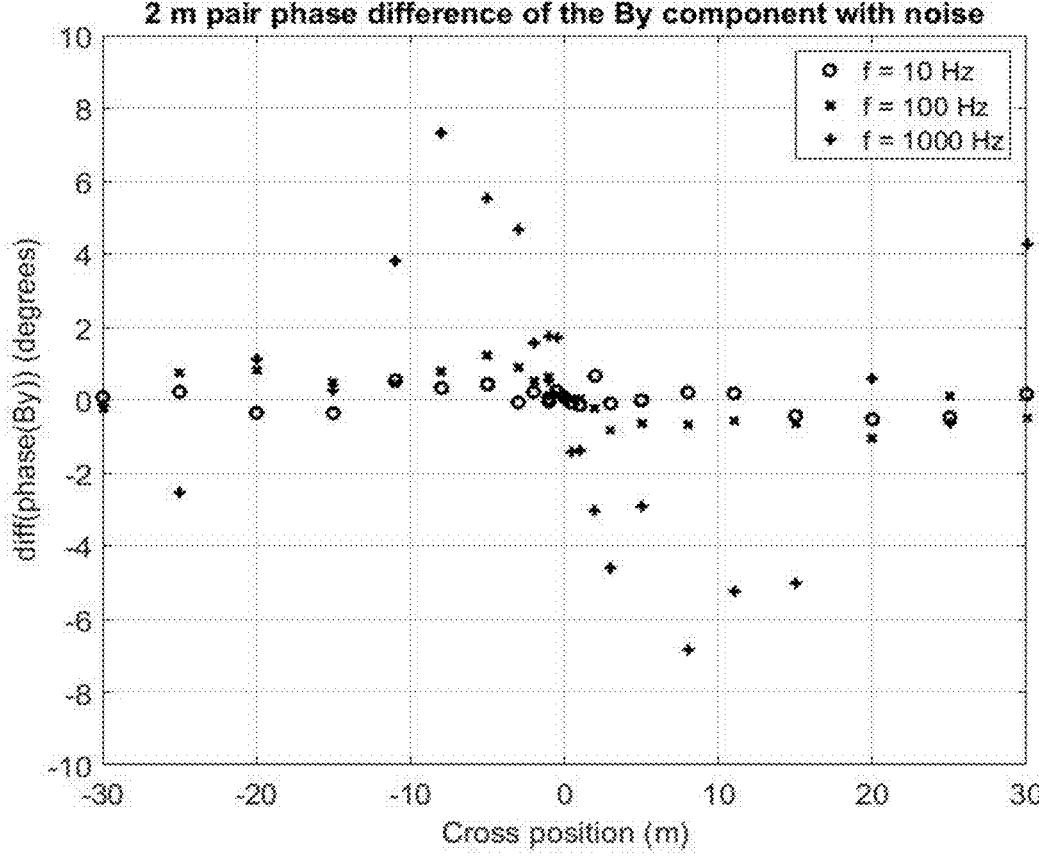
Figure 9C:
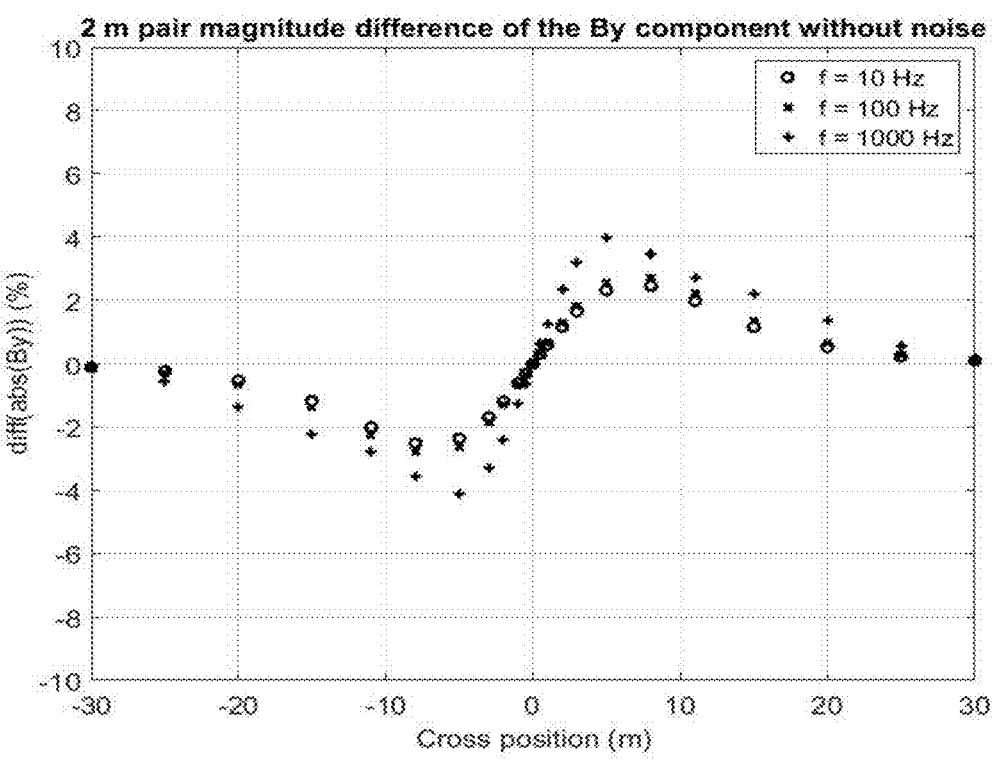
FIGS. 9c-9d show plots of the magnitude differences between the magnetic field y-components from two sensors separated by 2 m with and without noise for frequencies 10, 100, 1000 Hz.
Figure 9D:
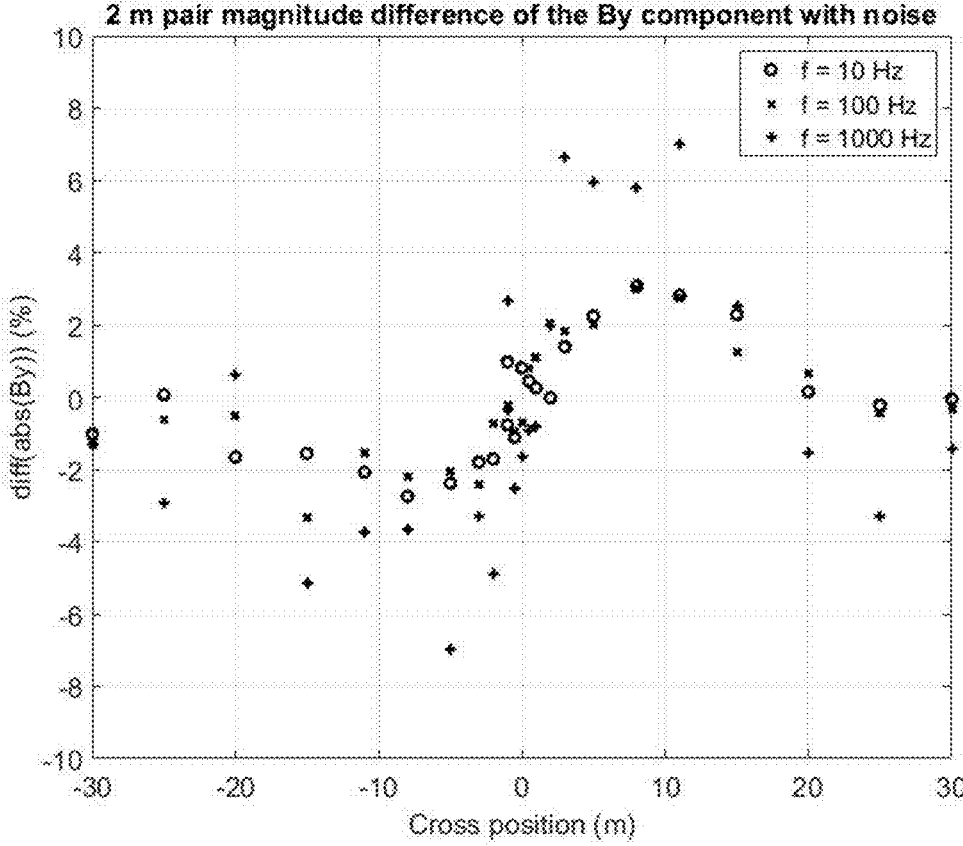

The situation is better for the magnetic field. The magnetic field component with the best sensitivity and signal to noise ratio also have the highest amplitude. In this, the $B_y$-component has about 80% sensitivity and 30 dB signal to noise ratio, FIGS. 7a and 7b, which is sufficient for detection and localization of the steel tube. It can also be observed that the phase changes, FIGS. 7c and 7d, are useful for the 100 and 1000 Hz frequencies. The 10000 Hz frequency has a signal to noise ratio that is lower than acceptable threshold, this is also the case for 10 Hz frequency. The magnetic field amplitudes plotted in FIG. 8 indicate that the $B_y$-component is preferable from an amplitude perspective too. The other components would not affect the sensitivity much even if the B-field axes are not perfectly perpendicular in the sensor assemblies. Hence, it can be concluded that the $B_y$-component (cross component) should be useful in the real measurement setup on the AUV 2.

Finally, the difference between data from the two sensor assemblies are computed and investigated. Phase and amplitude differences are computed between the $B_y$-component when the sensor assemblies (magnetometers) are separated by 1, 2 and 3 m along the cross direction, i.e. the y-direction. In coordinates, this means that the sensors are located at x=3 m and y=$y_{source}\pm y_{sep}$ where $y_{sep}$=0.5, 1.0 and 1.5 m. The z-coordinates are the same as for the source, i.e. 185 m which is 15 m above the seafloor.

The differences with 2 m separation are plotted in FIG. 9. It is shown that the differences change sign when crossing over to the other side of the buried object. This means that it is possible to determine whether the buried object (pipeline) is on the right or left side of the AUV. It is therefore important to use this data in the inversion algorithm for the position estimation.

In FIG. 9, it can also be seen that 1000 Hz gives the largest differences. They are also useful with the noise added to the data. The phase differences for 10 and 100 Hz are too small when noise is added. However, these frequencies can be used for the amplitude differences with the noise added. Hence, in a practical application a frequency range between 100 and 1000 Hz seems to be optimal if both amplitude and phase differences are to be used.

The first aspect of this disclosure shows a system for tracking an object that is at least partly buried in seabed, the system comprising: An Autonomous Underwater Vehicle AUV having a hull, a controlled electric dipole source mounted on the hull of the AUV; first sensor assembly mounted on the hull in the proximity of starboard side of the AUV 1; second sensor assembly mounted on the hull in the proximity of port side of the AUV; wherein the first and the second sensor assemblies are configured to measure magnetic field from electromagnetic energy transmitted from the controlled electric dipole source.

The controlled electric dipole source comprises at least two metal electrode plates mounted outside the hull of the AUV.

The first sensor assembly and the second sensor assembly each comprises 3-axes magnetometers.

The first sensor assembly and the second sensor assembly are separated from one another in a y-direction by a distance d.

The system comprises one or more 3-axis gradiometers.

The controlled electric dipole source operates in the frequency range between 10 and 10000 Hz.

The system further comprises a processor which is configured to use measurements from the first sensor assembly and the second sensor assembly to create a conductivity structure of the buried object.

The system further comprises one or more sources and acoustic sensors for recording reflected acoustic signal from the buried object.

A position of the buried object relative to the AUV is estimated from the magnetic data measured with the first and the second sensor assemblies.

The second aspect of this disclosure shows a method of tracking an object that is at least partly buried in seabed, the method comprising steps of: transmitting electromagnetic energy from An Autonomous Underwater Vehicle 2 having a hull equipped with a controlled electric dipole source; measuring magnetic field, amplitude and phase with a first sensor assembly and a second receiver assembly mounted on the AUV 2, wherein the first and the second sensor assemblies are separated from one another by a distance d in a direction that is perpendicular to the longitudinal direction of the AUV 2; using the measured magnetic field data amplitudes and phases differences between the first sensor assembly and the second sensor assembly to determining an estimate of a position of the buried object in relation to the AUV 2.

The electromagnetic energy transmitted by the controlled electric dipole source containing discrete frequencies between 10 and 10000 Hz and having a 1-10 seconds long output sequence.

The buried object being a pipeline.

The method further the method comprises a processor which is configured using measurements from the first and second sensors to creating a conductivity structure of the buried object.

The processor is further is configured to steering the AUV along the buried object.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A system for tracking an object that is at least partly buried in seabed, the system comprising:

an Autonomous Underwater Vehicle, AUV, comprising:
a hull,
a first sensor assembly mounted on the hull in proximity to a starboard side of the AUV;
a second sensor assembly mounted on the hull in proximity to a port side of the AUV; and
a controlled active electric dipole source for transmitting electric current in sequences mounted on the hull of the AUV,
wherein the first sensor assembly and the second sensor assembly are configured to measure a magnetic field from electromagnetic energy transmitted from the controlled active electric dipole source,
wherein the first sensor assembly and the second sensor assembly are separated from one another by a distance d in a direction that is perpendicular to a longitudinal direction of the AUV, and
wherein the system further comprises:
a processor configured to use measurements from the first sensor assembly and the second sensor assembly to estimate a position of a part of a buried object underneath or close to the AUV by inversion of magnetic field data using amplitudes and phases of the magnetic field measured by the first sensor assembly and the second sensor assembly.

2. The system according to claim 1, further comprising a tracking algorithm for calculating uncertainties of an estimated position of the part of the buried object based on input of the estimated position.

3. The system according to claim 2, wherein the tracking algorithm comprises a Kalman filter.

4. The system according to claim 1, wherein further comprising inversion algorithms that is a least-square minimization algorithm in which a function of a difference between modeled magnetic field data and measured magnetic field data is minimized with respect to coordinates of the part of the buried object underneath or close to the AUV.

5. The system according to claim 1, wherein the controlled active electric dipole source comprises at least two metal electrode plates mounted on an outside of the hull of the AUV.

6. The system according to claim 1, wherein the first sensor assembly and the second sensor assembly each comprises 3-axes magnetometer.

7. The system according to claim 1, further comprising one or more 3-axes gradiometers.

8. The system according to claim 1, wherein the controlled active electric dipole source operates in a frequency range between 10 and 10000 Hz, or between 100 and 1000 Hz.

9. The system according to claim 1, further comprising one or more acoustic sources for transmitting acoustic signals and acoustic sensors for recording a reflected acoustic signal from the buried object.

10. The system according to claim 1, wherein the processor is further configured to estimate a position of the buried object relative to the AUV is estimated from the magnetic field data obtained using the first sensor assembly and the second sensor assembly.

11. A method of tracking an object that is at least partly buried in seabed, the method comprising:

deploying the AUV according to claim 1;

transmitting the electric current in sequences from the AUV, having the hull equipped with the controlled active electric dipole source;

measuring magnetic field amplitude and phase with the first sensor assembly and the second sensor assembly mounted on the AUV, wherein the first sensor assembly and the second sensor assembly are separated from one another by the distance d in the direction that is perpendicular to the longitudinal direction of the AUV; and estimating the position of the part of the buried object underneath or close to the AUV by the inversion of the magnetic field data using the amplitudes and the phases of the magnetic field measured by the first sensor assembly and the second sensor assembly.

12. The method according to claim 11, further comprising calculating uncertainties of an estimated position of the part the buried object by a tracking algorithm based on the estimated position.

13. The method according to claim 12, further comprising using a Kalman filter for the tracking algorithm.

14. The method according to claim 11, wherein the inversion of the magnetic field data comprises using a least-square minimization algorithm and minimizing a function of differences between modeled magnetic field data and measured data with respect to coordinates of the part of the buried object underneath or close to the AUV.

15. The method according to claim 11, wherein the electromagnetic energy transmitted by the controlled active electric dipole source has a 1-10 seconds output sequence and contains discrete frequencies between 10 and 10000 Hz, or between 100 and 1000 Hz.

16. The method according to claim 11, wherein the buried object is a pipeline.

17. The method according to claim 11, wherein the processor is further configured to steer the AUV along the buried object.

* * * * *